United States Patent [19]
Street et al.

[11] Patent Number: 5,479,876
[45] Date of Patent: Jan. 2, 1996

[54] AUTOMATIC MILKING

[75] Inventors: Michael J. Street, Bedford; Toby T. F. Mottram, Chard; Arthur L. Wilkin, Hitchin; Robert C. Hall, St. Albans, all of England

[73] Assignee: British Technology Group Ltd., London, England

[21] Appl. No.: 167,996

[22] PCT Filed: May 31, 1994

[86] PCT No.: PCT/GB92/01110

§ 371 Date: May 6, 1994

§ 102(e) Date: May 6, 1994

[87] PCT Pub. No.: WO93/00001

PCT Pub. Date: Jul. 1, 1993

[30] Foreign Application Priority Data

Jun. 20, 1991 [GB] United Kingdom ............... 9113405

[51] Int. Cl.⁶ ................................. A01J 5/017
[52] U.S. Cl. ........................... 119/14.08; 119/14.1
[58] Field of Search ............... 119/14.02, 14.08, 119/14.1

[56] References Cited

U.S. PATENT DOCUMENTS

| | | | |
|---|---|---|---|
| 4,867,103 | 9/1989 | Montalescot et al. | 119/14.08 |
| 4,941,433 | 7/1990 | Hanauer | 119/14.1 |
| 5,069,160 | 12/1991 | Street et al. | 119/14.08 |

FOREIGN PATENT DOCUMENTS

| | | | |
|---|---|---|---|
| 91892 | 10/1983 | European Pat. Off. | |
| 188303 | 7/1986 | European Pat. Off. | |
| 213660 | 3/1987 | European Pat. Off. | |
| 300115 | 1/1989 | European Pat. Off. | |
| 320496 | 6/1989 | European Pat. Off. | 119/14.08 |
| 360354 | 3/1990 | European Pat. Off. | 119/14.08 |
| 2595197 | 9/1987 | France | |
| 2605841 | 5/1988 | France | |
| 3931769 | 4/1991 | Germany | |
| 2226941 | 7/1990 | United Kingdom | |

OTHER PUBLICATIONS

PCT, 9 206 588, Apr. 30, 1992.

Primary Examiner—Robert P. Swiatek
Attorney, Agent, or Firm—Cushman, Darby & Cushman

[57] ABSTRACT

An arrangement for the automatic application of milking apparatus to a milk animal including a milking apparatus store, a milking apparatus handling device including a milking apparatus carrier movable on the device and a teat sensor on the handling device together with at least one animal position sensor and a control unit responsive to the animal and teat sensor to operate the handling device, the arrangement being such that when an animal is sensed to be in milking position the control unit operates the handling device to take milking apparatus for a teat of the animal from the store in the carrier to a specific teat with the carrier moved to a sideways offset at a selected angle to the device and the teat sensor in range of the teat.

12 Claims, 3 Drawing Sheets

5,479,876

AUTOMATIC MILKING

This invention relates to the automatic application of milking apparatus to a milk animal such as a cow or a goat but is not restricted to these.

Techniques for the automatic application of milking apparatus are known, for example published patent Applications GB 2226941 (NRDC), EP 0213660 (Multinorm), EP 0300115 (DUVELSDORF), FR 2595197 (CEMAGREF) and the documents mentioned therein. In these techniques an automatic device, which includes or can acquire a milking apparatus such as one or more teat cups, follows the general movement in a stall of the animal to be milked to guide the milking apparatus to the general area of the udder of the animal and then uses a localised sensing apparatus to guide the milking apparatus on to an appropriate teat. It is well-known that cleanliness is vital for milking techniques but so far little attention has been given to the cleanliness problems that may arise in automatic milking.

It is an object of the present invention to provide automatic milking techniques in which cleanliness is easier to maintain.

According to the invention there is provided an arrangement for the automatic application of milking apparatus to an animal characterised by a milking apparatus store, a milking apparatus handling device including a milking apparatus carrier movable on the device and a teat sensor on the handling device together with at least one animal position sensor and a control unit responsive to the animal and teat sensors to operate the handling device, the arrangement being such that when an animal is sensed to be in milking position the control unit operates the handling device to take milking apparatus for a teat of the animal from the store in the carrier to a specific teat with the carrier moved to a sideways offset at a selected angle to the device and the teat sensor in range of the teat.

The carrier may be movable to turn a milking apparatus taken inverted to be upright. The teat sensor may be an open-jaw sensor effective to sense the teat by a sideways approach. The handling device may include a pivot and said carrier may be movable about said pivot between an inverted and an upright position and operable to acquire inverted milking apparatus from said store and said carrier may be effective by a single pivot action both to turn the acquired inverted apparatus upright and to position the upright apparatus offset from the handling device.

The handling device may include a guided elongate support member having pivoted at an outward end said carrier in the form of a teat-cup gripper, the axis of the pivot for the gripper being inclined at an angle to the elongate member but generally in the horizontal plane of the member. The angle may be approximately 45°. The support member may have at an inboard end a drive for said carrier and a drive shaft within the member to transmit drive to said carrier.

Conveniently the milking apparatus is individual teat cups hung inverted in a store by the milk hose alone and after release retractable into said store by pulling with the milk hose. The milk hose may be siamesed or otherwise combined with the pulsator hose. The milking apparatus may be individual teat cups each on a respective milk hose and held in a store to be above the level of the floor of a rear part of a stall at the milking position and beneath a raised front part of the stall. The individual teat cups may be taken from the store through a step in the floor of the stall to a raised front part of the stall floor.

The milking apparatus store may be at any convenient place adjacent or, if protected, within the stall. The store may be outside the stall adjacent the position of the fore or hind legs of an animal correctly In the stall. The movement and offset of the carrier may be chosen to suit the position of the store and the handling device.

The handling device may include a teat sensor of an open-jaw sensing arrangement having optical sensing beams directed to cross obliquely. The carrier may include an open-jaw sensing arrangement arranged above the gripper, with reference to the upright position, and including optical sensing beams directed to cross obliquely, effective to operate by sideways approach to a teat with the sensor above the lower end of the teat and the milking apparatus below said lower end.

Conveniently the handling means includes means to position a milking apparatus holding part to acquire the inverted apparatus and by movement of the holding part to move the acquired apparatus to the upright position for application to the animal.

Conveniently the milking apparatus is cleansed in the store in the inverted position to allow drainage.

Preferably said arrangement is at one side of a stall for an animal to be milked and said store is at the opposite side of said stall and said handling means is operable to extend under an animal in said stall to acquire apparatus from said store and retract and move rearwardly of an animal in said stall for application of said acquired apparatus to said animal.

The gripping means may be arranged to carry said apparatus in a retracted mode until an application position is achieved, the means being operable on the achievement of said application position to bring the apparatus to an active mode for application to an animal.

The invention also provides a method of automatically applying a milking apparatus to a milk animal including loosely retaining an animal at a milking position, providing a milking apparatus handling device alongside said position, acquiring with said device from a store above floor level a milking apparatus, supporting said apparatus on said device adjacent a teat sensor, offsetting said supported apparatus in said device, causing or permitting said supported apparatus to approach a selected teat of said animal and be applied to said teat.

Embodiments of the invention will now be described with reference to the accompanying drawings in which.

The general arrangement embodying the invention is a stall in which an animal, for this example a cow, is loosely retained. Preferably the front part of the stall floor is higher than that at the rear (e.g. UK patent application 9022804.0 and PCT patent application GB91/01831 incorporated by reference herein) and there is a manger at the front of the stall. Feed may be supplied to the manger in a controlled manner, for example an initial quantity followed by small amounts at intervals so that the head of the animal is attracted to the manger and maintains a steady position of the whole animal, reducing movement of the udder. An interval of 10 to 15 seconds has been found useful. To one side of the stall is an automatic milking apparatus handling device, a "robot", and on the opposite side of the stall is a store for milking apparatus, typically several distinct teat cups. The arrangement is such that the robot can extend across the stall under the animal to acquire an inverted teat cup, turn the teat cup upright and attach the cup to a specific teat.

Figure 1:
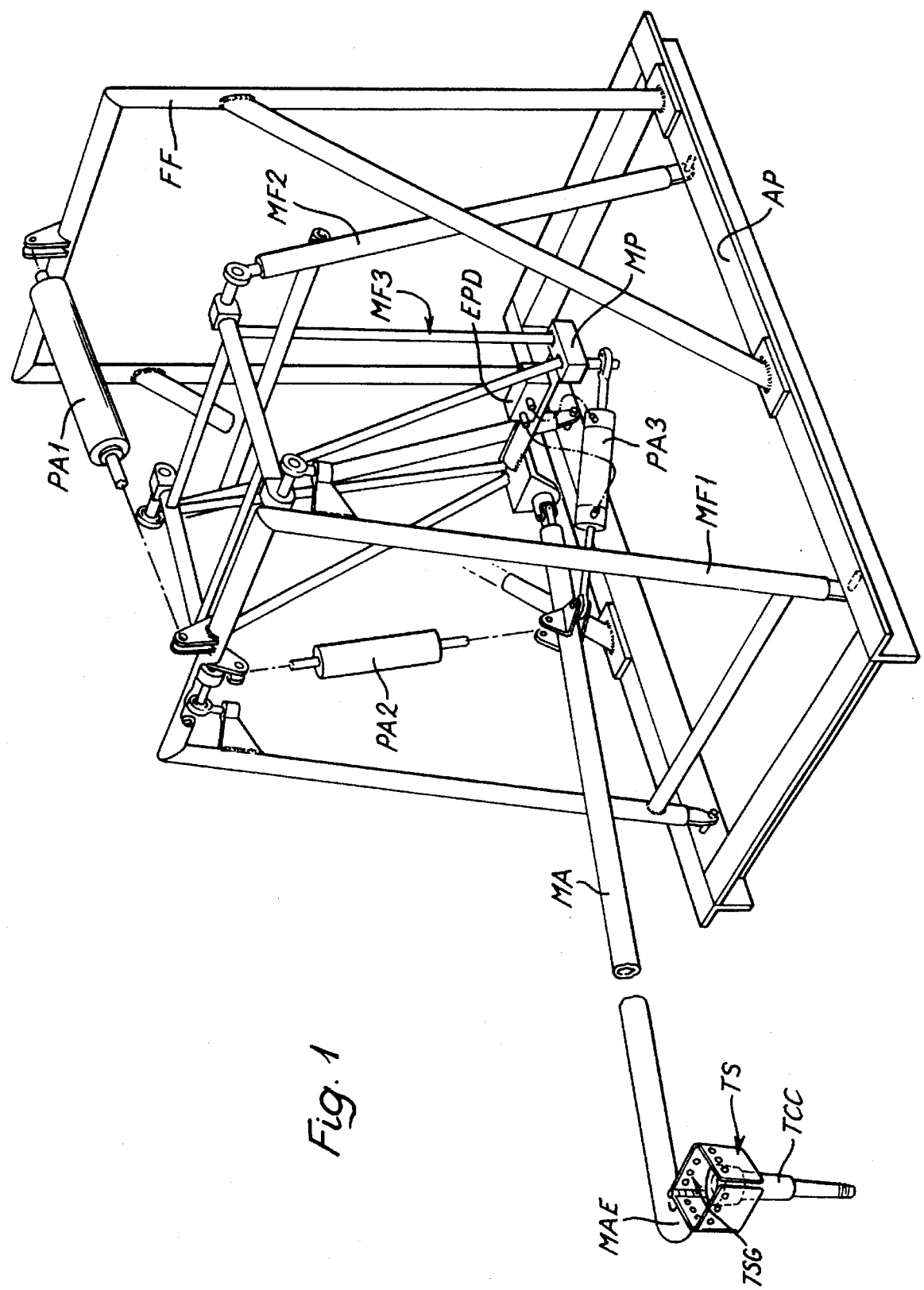
FIG. 1 is a general view of a milking "robot"

Typically the robot can be as illustrated in GB-A-2226941, for example as in FIG. 8 included herein as FIG. 1, and have a generally horizontal elongate member supported and controlled to be swingable and longitudinally displaceable beneath an animal in the stall. FIG. 1 shows the teat-cup holder of GB-A-2226941 but this is fixed and requires an opening action to receive a teat-cup and is to be considered as fitted with the arrangements now to be described for the purposes of the following.

At the end of the elongate member is a handling means including a gripping means pivoted on an axis inclined to the axis of the elongate member so that the gripping means can be moved from extending generally along the axis of the member to extending generally horizontally and at right angles to the axis of the member by a single pivoting action which also inverts the gripping means. The handling means includes an open-jaw optical sensing arrangement associated with the gripping means to detect the presence of a teat above a teat cup held in the gripping means and determine when to raise the teat cup to be then drawn onto the teat in the conventional way by the vacuum applied to the teat cup. This provides a second, localised, control in addition to the first, general, control provided by sensing means responsive to the movement of the animal in the stall. The robot operates the elongate member to move the gripping means, in the position (inverted) extending generally along the axis of the member, to take up an inverted teat cup. The robot then operates to move the teat-cup toward the udder and turn the teat cup upright. The action of the pivot mentioned above is to bring the upright teat cup to one side of the elongate member. This facilitates the application of the teat cup to a teat. The exact angle of the pivot axis to the elongate member can be chosen to suit a particular arrangement. In some embodiments to be described below the teat-cups are stored in a position other than inverted, for example parallel to the floor, but above the floor to ensure cleanliness. On release from a teat a cup may fall to the floor but the cup is cleanable, for example by back-flushing and draining or air-blowing, to ensure cleanliness.

Figure 2:
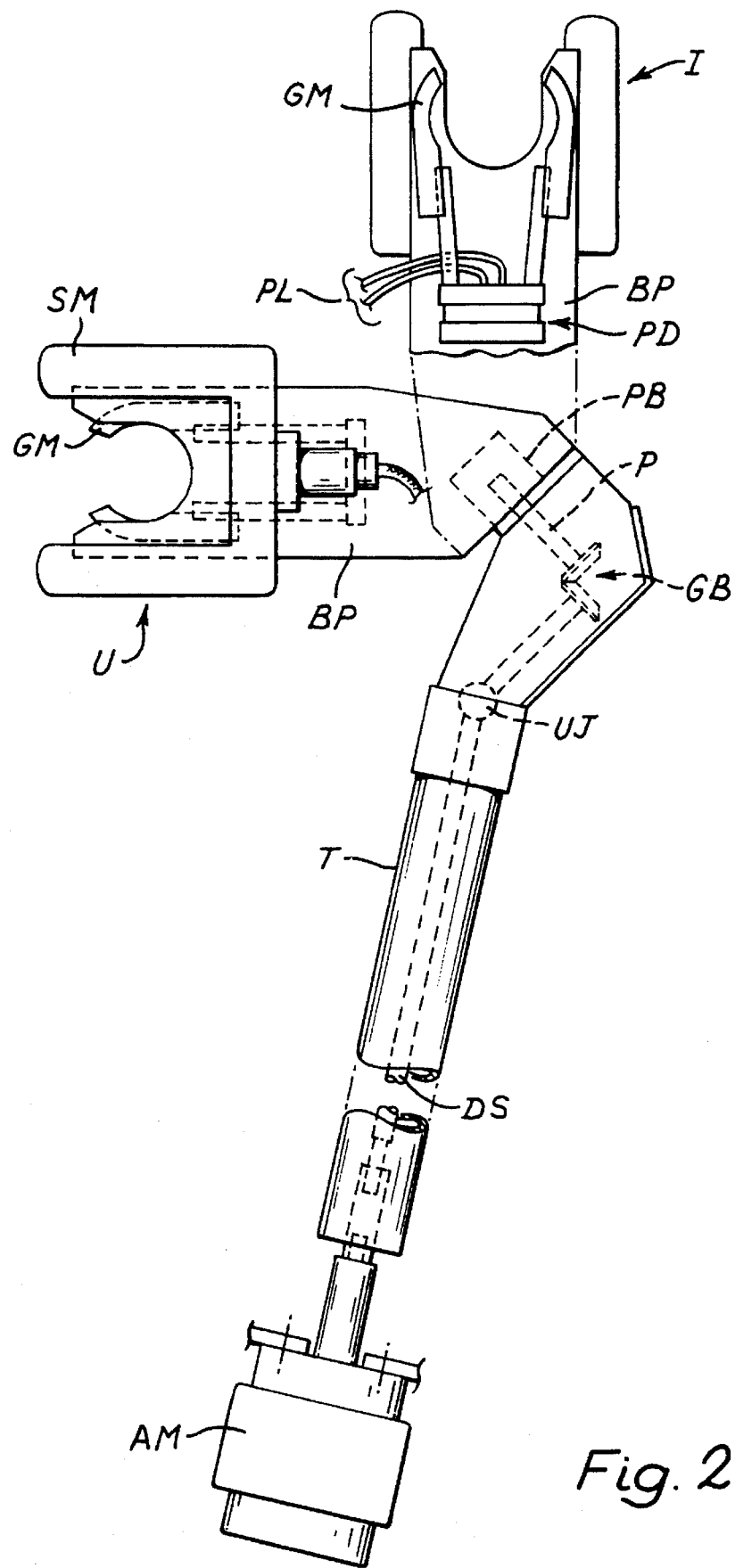
FIG. 2 is a plan view of a handling means showing two alternative settings of the handling means.
Figure 3:
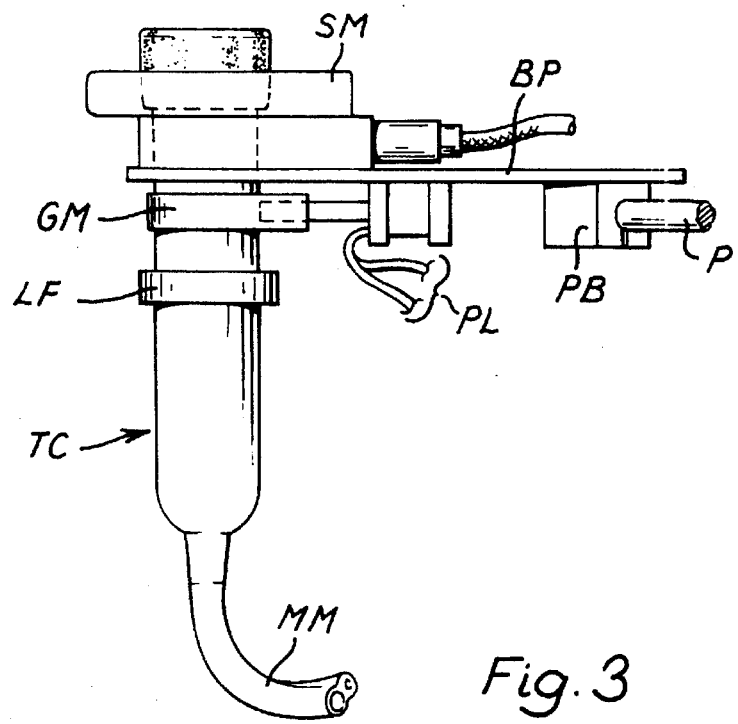
FIG. 3 is a side view of part of the handling means in FIG. 2.

FIG. 2 shows a plan view of a handling means embodying the invention and FIG. 3 shows a side view of part of the handling means in FIG. 2. The handling means is on an extension of the elongate member MA in FIG. 1 (not shown in FIG. 2) and is supported on the outer end of a tube T with a drive shaft DS, operated by an air motor AM, extending inside the tube. In a preferred arrangement the air motor is inboard of the attachment point of actuators PA2 and PA3 to member MA and tube T is effectively the greater part of member MA. At the outer end of tube T is a pivot P for gripping means GM and an associated sensing means SM mounted on a gearbox GB. The axis of pivot P is inclined at approximately 45° to the axis of the elongate member MA, in the horizontal plane in use, and the pivot carries a slot-ended baseplate BP on which the gripping means and sensing means are carried. The drive shaft DS is connected to the gearbox GB by a universal joint UJ so that, in operation, the air motor can be energised to rotate the baseplate about the axis of pivot P to move it and the supported elements between the inverted position, indicated at I, and the upright position, indicated at U. In the inverted position the baseplate extends from the tube T approximately in the direction of the tube and in the upright position extends at approximately right angles to the direction of the tube. Suitable stops or other devices to control or limit the rotation of the baseplate can be provided.

This simple movement, conveniently called a wrist-action, about a single pivot provides a robust, economic arrangement which can acquire an inverted teat cup by reaching beneath an animal to a teat cup store and then turn the teat cup upright and hold it in the appropriate position for sideways movement towards the udder. Clearly by simple alterations of dimensions and angles teat-cups stored in other orientations and positions can be acquired. Furthermore other equipment than a teat-cup carrier can be fitted by arranging a plug-in connection to the tube T, and drive shaft DS if required. For example teat inspection and cleaning devices or other "end-effectors" may be provided so that the arrangement can carry out various functions at the milking position or such an arrangement can be used before or after the milking position. Those skilled in the art will be able to readily produce such adaptions, given the guidance in this description.

The gripping means GM is conveniently operated by a pneumatic device PD supplied by pneumatic supply lines PL to open and close the gripping means as required.

Figure 4:
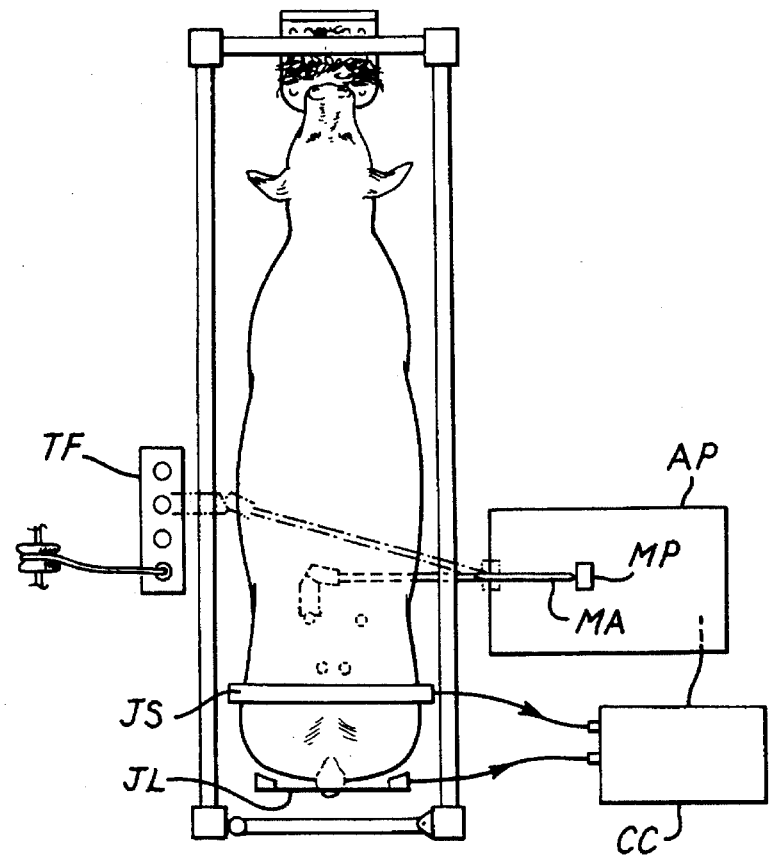
FIG. 4 is a schematic plan view of a typical arrangement.

The teat cups, one being shown in FIG. 3 at TC, are of generally conventional form: each having a milking hose MH of the "siamesed" type, combining the pulsator and milk hoses in a single element of generally figure-eight cross-section. The store TF, positioned alongside the stall opposite the robot AP as indicated in FIG. 4, carries the teat cups in the inverted position hanging on the milking hoses. A location flange LF on each teat cup limits the amount by which a teat cup can be drawn into the store by tension applied to the milking hose. The gripping means GM acquires a teat cup by gripping the cup below, in the inverted sense of the cup, the flange LF. When the air motor AM is energised to turn the cup upright the cup can then rest on the baseplate and in the slot end of the plate. This leaves the sensing means to respond to a teat within the open-jaw of the sensing means and position the cup below the teat. If required the gripper can be arranged to have different degrees of grip so that the height of the cup in the handling means can be controlled. The robot is then operated to raise the holding means and thus the teat cup towards the teat so that the vacuum applied to the cup can draw the cup onto the teat. After milking the vacuum can be stopped to allow the teat cup to fall away from the teat and be withdrawn to the store by tension on the milking hose applied in any convenient manner.

The sensing means includes a number of optical transmitters and receivers to provide crossing light beams in the space inside the sensing means which can determine, with suitable circuit means, the position of a teat in the sensing means so that the teat cup can be moved below the teat. The beams are conveniently arranged generally diagonally, apart from one directly across near the open end and one directly across near the closed end of the sensing means. There may be three diagonal beams from each side, inclined at some 60° to the side to form an obliquely crossing pattern. Suitable machining or moulding of the housing for the optical devices provides positioning for the devices at required angles. An important feature is that the sensing means does not have moving parts, as hitherto has been the case to enable the sensing means to be opened to allow entry of the teat cup, being an open-jaw form. Avoidance of moving parts greatly increases reliability, reduces cost and eases cleaning. A separate electrical cable for the sensor signal information is preferred to improve noise resistance.

Reference has been made to other positions for the teat-cup store. Instead of being on the other side of the animal from the robot AP the store can be on the same side but adjacent the front or hind legs of the animal and outside the stall. The teat-cups can be stored upright or inverted as preferred and suitable cleaning arrangement provided. Adjustments to the wrist action will be readily apparent to those skilled in the art. The offset angle may be a right angle and the carrier may move from a right angle offset to one side of the member to a right angle offset on the other side. The various actions and operations are regulated by a central controller CC in FIG. 4.

The inverted teat cups hanging in the store relatively free of obstruction can be cleaned in place by flushing and allowing to drain. No connection other than the milking hose is needed, again simplifying construction and aiding cleanliness particularly as the milking apparatus is usually allowed to fall to the floor of the stall and then dragged across it. The simple arrangement of the gripping and sensing means with a single pivot also assists cleanliness. The open jaw sensor enables the teat-cup to approach at a higher level than when a closed sensor is used. A spray for the udder of the animal may be provided at the exit from the stall and operated by the animal leaving the stall stepping down form a raised part. This improves spray access.

The techniques described above provide significant improvements in the teat-cup applying a stage of automatic milking by simplifying construction and operation and aiding cleanliness.

We claim:

1. An arrangement for the automatic application of milking apparatus to an animal comprising:

a milking apparatus store, a milking apparatus handling device including a milking apparatus carrier movable on the device, and said handling device further including a guided elongate support member having pivoted at an outward end said carrier in the form of a teat-cup gripper, the axis of the pivot for the gripper being inclined at an angle to the elongate member but generally in the horizontal plane of the member, and a teat sensor on the handling device together with at least one animal position sensor and a control unit responsive to the animal and teat sensor to operate the handling device, the arrangement being such that when an animal is sensed to be in milking position the control unit operates the handling device to take milking apparatus for a teat of the animal from the store in the carrier to a specific teat with the carrier moved to a sideways offset at a selected angle to the device and the teat sensor in range of the teat.

2. An arrangement according to claim 1 characterised in that the carrier is movable to turn a milking apparatus taken inverted to be upright.

3. An arrangement according to claim 1 characterised in that the teat sensor is an open-jaw sensor effective to sense the teat by a sideways approach.

4. An arrangement according to claim 1 in which said handling device includes a pivot and said carrier is movable about said pivot between an inverted and an upright position and operable to acquire inverted milking apparatus from said store and in which said carrier is effective by a single pivot action both to turn the acquired inverted apparatus upright and to position the upright apparatus offset from the handling device.

5. An apparatus according to claim 1 in which the angle is approximately 45°.

6. An apparatus according to claim 1 in which the support member has at an inboard end a drive for said carrier and a drive shaft within the member to transmit drive to said carrier.

7. An apparatus according to claim 1 in which the milking apparatus is individual teat cups each on a respective milk hose and hung inverted in a store by the milk hose alone and after release retractable into said store by pulling with the milk hose.

8. An apparatus according to claim 1 in which the milking apparatus is individual teat cups each on a respective milk hose and held in a store to be above the level of the floor of a rear part of a stall at the milking position and beneath a raised front part of the stall.

9. An apparatus according to claim 1 in which the handling device includes a teat sensor of an open-jaw sensing arrangement having optical sensing beams directed to cross obliquely.

10. An apparatus according to claim 1 in which the carrier includes an open-jaw sensing arrangement arranged above the gripper, with reference to the upright position, and including optical sensing beams directed to cross obliquely, effective to operate by sideways approach to a teat with the sensor above the lower end of the teat and the milking apparatus below said lower end.

11. An arrangement according to claim 1 in which the milking apparatus is held and cleansed in the store in the inverted position to allow drainage.

12. An arrangement according to claim 1 for installation at one side of a stall for an animal to be milked, said store being at the opposite side of said stall, and in which said handling device is operable to extend under an animal in said stall to acquire apparatus from said store and retract and move rearwardly, that is in the head to tail direction, of an animal in said stall for application of said acquired apparatus to said animal.

* * * * *

UNITED STATES PATENT AND TRADEMARK OFFICE
CERTIFICATE OF CORRECTION

PATENT NO. : 5,479,876
DATED : January 2, 1996
INVENTOR(S) : STREET et al.

It is certified that error appears in the above-indentified patent and that said Letters Patent is hereby corrected as shown below:

On the title page, change

"[22] PCT filed: May 31, 1994"

to

--[22] PCT filed: June 19, 1992--.

Signed and Sealed this

Twenty-eighth Day of May, 1996

Attest:

BRUCE LEHMAN

Attesting Officer     Commissioner of Patents and Trademarks